2,835,695
MIXED ESTER COMPOSITIONS OF CARBOCYCLIC 1,2-DICARBOXYLIC ACIDS

Alfred F. Steinhauer, Midland, Mich., assignor to The Dow Chemical Company, Midland, Mich., a corporation of Delaware No Drawing. Application July 28, 1955
Serial No. 525,069

9 Claims. (Cl. 260—468)

This invention concerns certain new mixed ester compositions of carbocyclic 1,2-dicarboxylic acids. It relates more particularly to mixed esters of phthalic acid, tetrahydrophthalic acid or hexahydrophthalic acid, wherein one of the carboxyl groups of said acid is esterified with an aliphatic alcohol and the other carboxyl group is esterified with a polyoxyalkylol amine.

The new mixed ester compositions of the invention are all soluble in water and are capable of reducing the surface tension of water and its interfacial tension against oils. They have utility as wetting agents or emulsifying agents. They are useful for dispersing finely divided solids or water immiscible organic liquids in aqueous solutions, e. g. in the manufacture of agricultural spray compositions, and as the active ingredient in the preparation of detergents and washing powders.

The mixed ester compositions are prepared by reacting an alkyl monoester of a carbocyclic 1,2-dicarboxylic acid selected from the group consisting of phthalic acid, 4-cyclohexene-1,2-dicarboxylic acid, tetrahydrophthalic acid, and hexahydrophthalic acid, wherein the alkyl radical contains from 8 to 18 carbon atoms, with a polyoxyalkylol amine to obtain a corresponding mixed ester product.

The alkyl monoester of the carbocyclic 1,2-dicarboxylic acid starting material can be prepared by reaction of equimolecular proportions of a saturated aliphatic alcohol containing from 8 to 18 carbon atoms in the molecule with phthalic acid, 4-cyclohexene-1,2-dicarboxylic acid, or hexahydrophthalic acid, or an anhydride of such acid, in usual ways. The alkyl monoester starting material is usually prepared by heating a mixture of equimolecular proportions of phthalic anhydride, tetrahydrophthalic anhydride (4-cyclohexene-1,2-dicarboxylic acid anhydride) or hexahydrophthalic anhydride, and a saturated aliphatic alcohol containing from 8 to 18 carbon atoms in the molecule, at temperatures between about 100° and 120° C. by a procedure similar to that employed for the preparation of sec-octyl hydrogen phthalate described in "Organic Syntheses," Collective Volume 1, page 418, (1921).

The polyoxyalkylol amines starting material to be employed in preparing the new water-soluble mixed ester compositions of the invention are polyoxyalkylol amines having the general formula:

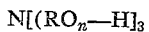

wherein RO represents an oxyalkylene radical containing from 2 to 4 carbon atoms and $n$ is a whole number from 11 to 96, and in which polyoxyalkylol amine at least one-third of the total RO groups are oxyethylene radicals.

The polyoxyalkylol amines can be prepared by reaction of ethylene oxide, or ethylene oxide and at least one of the alkylene oxides, propylene oxide, or butylene oxide, with a mono-, di-, or triethanolamine, a mono-, di-, or triisopropanolamine, or a mixed di-, or tri-, ethanol-isopropanolamine, in the presence of a strong alkali catalyst such as sodium hydroxide or potassium hydroxide, and with the proportion of said alkylene oxide, or oxides, controlled so as to obtain a product having an average molecular weight of at least 500, preferably from 500 to 6000. The polyoxyalkylol amine may be one in which all of the oxyalkylene groups are oxyethylene groups $(C_2H_4O)$, or it may be a condensation product of an ethanolamine, or an isopropanolamine, and ethylene oxide and at least one of the alkylene oxides, propylene oxide, or butylene oxide, wherein at least one-third of the total oxyalkylene groups are oxyethylene groups. Methods for making mixed polyoxyalkylol amines by reacting 1,2-propylene oxide and ethylene oxide, or 1,2-butylene oxide and ethylene oxide with an alkanolamine, e. g. ethanolamine or isopropanolamine, and with the proportions of the alkylene oxides controlled to give a desired product are disclosed in applications Serial Nos. 499,247 and 499,248, filed April 4, 1955, by Thomas Houtman, Jr. et al. In general, an alkylene oxide, e. g. ethylene oxide, is reacted with an alkanolamine such as ethanolamine or isopropanolamine, starting material in a suitable reaction vessel in the presence of a small amount, usually 5 percent by weight or less, of sodium hydroxide or potassium hydroxide as catalyst. The mixture of the alkanolamine and the catalyst is stirred and heated to temperatures within the range of from 80° to 200° C. and the alkylene oxide added, preferably under superatmospheric pressures of up to 100 pounds per square inch gauge pressure, and at approximately the rate at which it is consumed in the reaction. The average molecular weight of the polyoxyalkylol amine product is controlled by regulating the proportion of the alkylene oxide fed to and consumed in the reaction. In making polyoxyalkylol amines containing mixed oxyalkylene groups such as both oxyethylene and oxypropylene, oxyethylene and oxybutylene, or oxyethylene, oxypropylene and oxybutylene, groups in the molecule, the alkylene oxides may be fed to the reaction in any desired sequence. For instance, ethylene oxide may be first condensed with the ethanolamine or isopropanolamine starting material, followed by the introduction and reaction of propylene oxide in the desired proportion. This may be followed by the introduction and reaction of a further amount of ethylene oxide, or of butylene oxide, to produce a desired product. The polyoxyalkylol amine starting material may be obtained from any source and may contain oxyalkylene groups having from two to four carbon atoms in any desired sequence, it being limited only by the aforementioned requirements that the polyoxyalkylol amine starting material has a molecular weight of at least 500, preferably between 500 and 6000, and that at least one-third of the total number of oxyalkylene groups in the molecule be oxyethylene groups. Polyoxyalkylol amines containing all oxyethylene groups or polyoxyalkylol amines containing mixed oxyalkylene groups wherein the oxypropylene or oxybutylene groups are attached or adjacent to the amine group and the oxyethylene groups are remote from the amine group, are preferred.

In preparing the water-soluble mixed esters with which the invention is concerned, the alkyl monoester of the carbocylic 1,2-dicarboxylic acid starting material can be employed in amounts corresponding to from one to three gram molecular proportions per gram molecular equivalent proportion of the polyoxyalkylol amine initially used. The obtaining of a water-soluble mixed ester product is dependent upon a number of variables each of which has an effect on the solubility of the product in water and its surface active properties. Among the variables which have been found to effect the water-solubility and surface active properties of the product are: (a) the number of carbon atoms in the alkyl group of the alkyl monoester of the carbocyclic 1,2-dicarboxylic acid starting material; (b) the molecular weight of the polyoxyalkylol amine starting material; (c) the relative proportions of the alkyl monoester and the polyoxyalkylol amine employed; and (d) the proportion of oxyethylene groups relative to the total number of oxyalkylene groups in the polyoxyalkylol amine starting material. At least one-third of the total number of oxyalkylene groups in the polyoxyalkylol amine starting material shall be oxyethylene groups.

In general, a mixture of equal or substantially equimolecular proportions of an alkyl monoester of phthalic acid, 4-cyclohexene-1,2-dicarboxylic acid or hexahydrophthalic acid, which ester contains from 8 to 18 carbon atoms in the alkyl radical, and a polyoxyalkylol amine having a molecular weight of at least 500, preferably from 500 to 6000, as herein specified can be reacted with one another to produce a water-soluble mixed ester product having good surface active properties. When the alkyl monoester starting material is employed in amount corresponding to two moles of the ester per mole of the polyoxyalkylol amine, the amine should have a molecular weight of approximately 2000 or greater in order to obtain a water-soluble mixed ester product having good surface active properties.

The number of carbon atoms in the alkyl group of the alkyl monoester starting material appears to have the most pronounced effect on the solubility of the final product in water when the alkyl monoester is employed in amount corresponding to three moles per mole of the polyoxyalkylol amine. For the obtaining of a water-soluble mixed ester product employing octyl hydrogen phthalate or dodecyl hydrogen phthalate and a polyoxyalkylol amine as herein specified in proportions corresponding to three moles of the monoester per mole of the polyoxyalkylol amine the amine should have a molecular weight of 3000 or greater, and when using 1-octadecyl hydrogen phthalate as the monoester starting material, a polyoxyalkylol amine having a molecular weight of at least 3500 is usually required. For these reasons the alkyl monoester starting material is preferably employed in amounts of from one to two moles per mole of the polyoxyalkylol amine initially used.

The minimum molecular weight of the polyoxyalkylol amine starting material required to obtain a water-soluble mixed ester composition having good surface active properties varies with the molar ratio of the alkyl monoester starting material to the polyoxyalkylol amine employed. The approximate minimum molecular weight of the polyoxyalkylol amine starting material required to obtain a water-soluble mixed ester composition upon reaction with an alkyl monoester of a carbocyclic 1,2-dicarboxylic acid as herein defined in proportions corresponding to from one to three moles of the alkyl monoester per mole of the polyoxyalkylol amine can readily be determined from the empirical equation:

$$\text{Mol. wt.} = 1500x - 1000$$

wherein $x$ represents the moles of the alkyl monoester per mole of the polyoxyalkylol amine.

The carbocyclic 1,2-dicarboxylic acid alkyl monoesters and the polyoxyalkylol amine starting materials can be reacted with one another in usual ways to form the water-soluble mixed ester products of the invention. For instance, an alkyl monoester of a carbocyclic 1,2-dicarboxylic acid and a polyoxyalkylol amine as herein specified can be reacted with one another by direct esterification in the presence of an acidic catalyst such as sulfuric acid or benzene sulfonic acid or in an inert solvent such as benzene or toluene, which latter may be employed as an entraining agent for removing water from the reaction mixture as it is formed. The starting materials can be heated in admixture with one another at temperatures of from 150°–180° C. at atmospheric pressure, or under reduced pressure, and in the absence of a catalyst, to effect an esterification reaction with formation of a water-soluble mixed ester product. In an alternate procedure, the alkyl monoester of the carbocyclic 1,2-dicarboxylic acid starting material can be converted to the corresponding acyl halide, in known ways, e. g. by reaction of dodecyl hydrogen phthalate with thionyl chloride to form dodecyl ortho-chloroformyl benzoate, and the latter reacted with a polyoxyalkylol amine as herein specified in the desired proportions to obtain a corresponding water-soluble mixed ester product. In such instance, the ester product is usually neutralized with an alkali, e. g. sodium hydroxide, to destroy residual traces of hydrohalic acid.

The following examples illustrate certain ways in which the principle of the invention has been applied, but are not to be construed as limiting its scope.

EXAMPLE 1

A polyoxyalkylol amine starting material for use in the subsequent example, was prepared by placing 20 pounds of monoisopropanolamine, together with 0.8 pound of potassium hydroxide as catalyst in a pressure resistant vessel equipped with a stirrer. The mixture was stirred and heated to a temperature of 100° C. Propylene oxide was added over a period of approximately 30 hours while stirring and heating the mixture at gradually increased reaction temperatures between 100° and 135° C. until a total of 250.5 pounds of propylene oxide was fed to the reaction. Thereafter, 270.5 pounds of ethylene oxide was fed to the reaction under a pressure of up to 50 pounds per square inch gauge pressure over a period of 32 hours, while stirring and heating the mixture at temperatures between 125° and 135° C. After reaction of substantially all of the ethylene oxide, as indicated by a lowering of the pressure in the reaction vessel, the mixture was neutralized with 1-normal aqueous hydrochloric acid solution and heated at temperatures between 125° and 135° C. at 10 millimeters absolute pressure to remove volatile substances, then cooled and removed from the vessel. The polyoxyalkylol amine was a yellow liquid having a viscosity of 192 centistokes at 100° F. It was analyzed and found to contain 0.71 percent by weight of nitrogen. The polyoxyalkylol amine had a molecular weight of 1975.

EXAMPLE 2

A mixture of 65.8 grams of the batch of the polyoxyalkylol amine described in Example 1, and 22.8 grams of dodecyl hydrogen phthalate, previously prepared by heating equimolecular proportions of phthalic anhydride and a commercial grade of dodecyl alcohol at reaction temperatures between 105° and 110° C. for a period of 5 hours, was placed in a glass reaction flask. The mixture was heated at temperatures of from 165° to 175° C. at an absolute pressure of 5 millimeters for a period of 2.5 hours, then cooled. The mixed ester product was obtained as a yellow liquid having a specific gravity of 1.0595 at 100° C. compared to that of water at 4° C., and an absolute viscosity of 38 centipoises at 100° C. It was soluble in water. Surface active properties for the product were determined on an aqueous solution of distilled water containing 0.1 percent by weight of the product. The procedure for determining the amount of foam was similar to the Ross-Miles foam test. The wetting time was determined by the Draves-Clarkson sinking time test. The surface tension of an aqueous solution of distilled water containing 0.1 percent by weight of the product was determined at 25° C., employing a standard tensiometer. The product had the surface active properties:

Foam height _____ mm__ 65
Wetting time _____ min__ 1.11
Surface tension _____ dynes/sq. cm__ 30.4

EXAMPLE 3

(A) A mixture of 304.2 grams (2 moles) of tetrahydrophthalic anhydride (4-cyclohexene-1,2-dicarboxylic acid anhydride) and 391.6 grams (2 moles) of a commercial grade of dodecyl alcohol was stirred and heated at temperatures of from 105°–110° C. for a period of 5 hours, then cooled. The 4-cyclohexene-1,2-dicarboxylic acid dodecyl monoester was obtained as a white wax-like product.

The dodecyl monoesters of phthalic acid, or hexahydrophthalic acid, can be prepared from phthalic anhydride, or hexahydrophthalic anhydride, and dodecyl alcohol in a similar manner.

(B) A charge of 670.8 grams (1.9 moles) of the 4-cyclohexene-1,2-dicarboxylic acid dodecyl monoester prepared in part A above was placed in a glass reaction flask equipped with a reflux condenser and stirrer. The mixture was heated to a temperature of 60° C. and stirred. Thereafter, 231 grams (1.9 moles) of thionyl chloride was slowly added while stirring and heating the mixture at temperatures between 60° and 70° C. The mixture was stirred at temperatures of from 60°–70° C. for a period of 2 hours, then cooled to room temperature and stirred for 4 hours. HCl and $SO_2$ formed in the reaction were vented through the reflux condenser. The acyl chloride of the 4-cyclohexene-1,2-dicarboxylic acid dodecyl monoester was obtained as a light brown liquid product and in a substantially quantitative yield.

(C) A polyoxyalkylol amine starting material was prepared by procedure similar to that described in Example 1, by reacting propylene oxide with isopropanolamine in proportions corresponding to approximately 33 gram moles of the isopropanolamine, then adding ethylene oxide in amount corresponding to approximately 28 gram moles of the ethylene oxide per gram mole of the isopropanolamine starting material. The polyoxyalkylol amine was a yellow liquid having a viscosity of 274 centistokes at 100° F. and had a molecular weight of 3260. It was analyzed and found to contain 0.43 percent by weight of nitrogen.

(D) A charge of 44.5 grams of the polyoxyalkylol amine described in part (C) above was placed in a glass reaction flask equipped with a reflux condenser and stirrer. It was stirred and heated to a temperature of 80° C. Thereafter, 5 grams of the acyl chloride of the 4-cyclohexene-1,2-dicarboxylic acid dodecyl monoester, described in part (B) above was added. The mixture was stirred and heated at temperatures of from 80° to 90° C. for one hour. HCl formed in the reaction was vented through the reflux condenser. The reaction mixture was neutralized with an aqueous 50 weight percent solution of sodium hydroxide. The mixed ester product was obtained as a viscous yellow liquid having specific gravity of 1.0073 at 100° C. compared to that of water at 4° C., and an absolute viscosity of 48 centipoises at 100° C. It was soluble in water and had good emulsifying properties. Surface active properties for the product were determined on an aqueous solution of distilled water containing 0.1 percent by weight of said product. The procedure for determining the amount of foam was similar to the Ross-Miles foam test. The wetting time was determined by the Draves-Clarkson sinking time test. The surface tension was determined for the solution at 25° C. employing a standard tensiometer. The product had the surface active properties:

Foam height_____mm__ 69
Wetting time_____min__ 0.65
Surface tension_____dynes/sq. cm__ 34.1

EXAMPLE 4

A charge of 22.3 grams of the batch of the polyoxyalkylol amine described in part (C) of Example 3, was reacted with 5 grams of the batch of the acyl chloride of the 4-cyclohexene-1,2-dicarboxylic acid dodecyl monoester product described in part (B) of said example, by procedure similar to that described in part (D) of said example. The product was a yellow liquid having a specific gravity of 1.0002 and an absolute viscosity of 41 centipoises at 100° C. It was soluble in water and was a good wetting agent. Surface active properties were determined for the product by procedures similar to those employed in Example 2. The product had the surface active properties:

Foam height_____mm__ 65
Wetting time_____min__ 0.52
Surface tension (aqueous)_____dynes/sq. cm__ 33.5

EXAMPLE 5

A charge of 29.7 grams of the batch of the polyoxyalkanol amine described in part (C) of Example 3, was reacted with 10 grams of the batch of the acyl chloride of the 4-cyclohexene-1,2-dicarboxylic acid dodecyl monoester described in part (B) of said example. The procedure for carrying out the reaction was similar to that described in part (D) of Example 3. The product was a light yellow liquid having a specific gravity of 0.9967 and an absolute viscosity of 45 centipoises at 100° C. It was soluble in water. The product had the surface active properties:

Foam height_____mm__ 45
Wetting time_____min__ 0.53
Surface tension (aqueous)_____dynes/sq. cm__ 33.2

EXAMPLE 6

A charge of 14.1 grams of a liquid polyoxyalkylol amine having a viscosity of 120 centistokes at 100° F. and a molecular weight of 511, was placed in a glass reaction flask equipped with a reflux condenser and stirrer. The polyoxyalkylol amine employed in the experiment was prepared by reacting propylene oxide with monoisopropanolamine in amount corresponding to 3 moles of the propylene oxide per mole of the isopropanolamine, then adding ethylene oxide in amount corresponding to approximately 6 moles of the ethylene oxide per mole of the isopropanolamine, employing a procedure similar to that described in Example 1. The charge of the polyoxyalkylol amine starting material was stirred and heated to a temperature of 80° C. Ten grams of dodecyl ortho-chloroformyl benzoate was added and the mixture heated and stirred at temperatures of from 80° to 90° C. for one hour. HCl formed in the reaction was vented through the reflux condenser. The dodecyl ortho-chloroformyl benzoate employed in the experiment was previously prepared by reacting equimolecular proportions of dodecyl hydrogen phthalate and thionyl chloride with one another at a temperature of 60° C. employing a procedure similar to that described in part (B) of Example 3. The mixed ester reaction product of the dodecyl ortho-chloroformyl benzoate and the polyoxyalkylol amine having a molecular weight of 511 was a brown liquid having a specific gravity of 1.0108 and an absolute viscosity of 32 centipoises at 100° C. It was soluble in water. Surface active properties for the product were determined by procedures similar to those as mentioned in Example 2. The product had the surface active properties:

Foam height _____mm__ 40
Wetting time _____min__ 1.07
Surface tension _____dynes/sq. in__ 30.4

EXAMPLE 7

A mixture of 5-grams of dodecyl ortho-chloroformyl benzoate and 16.6 grams of a polyoxyalkylol amine was reacted by procedure similar to that described in Example 6. The polyoxyalkylol amine employed in the experiment was a liquid having a viscosity of 95 centistokes at 100° F. It was prepared by reacting propylene oxide with monoethanolamine in amount corresponding to approximately 8.5 moles of the propylene oxide per mole of the ethanolamine, then adding ethylene oxide in amount corresponding to approximately 4 moles of the ethylene oxide per mole of the ethanolamine, employing a procedure similar to that described in Example 1. The polyoxyalkylol amine starting material had a molecular weight of 840 and contained 1.67 percent by weight of nitrogen. It was soluble in water. The reaction product of the polyoxyalkylol amine and the dodecyl ortho-chloroformyl benzoate, i. e. the mixed ester product, was a light brown liquid. It was soluble in water. Surface active properties for the product were determined employing procedures mentioned in Example 2. The product had the surface active properties:

Foam height _____ mm__ 54
Wetting time _____ min__ 1.17
Surface tension _____ dynes/sq. cm__ 32.8

EXAMPLE 8

A mixture of 5 grams of dodecyl ortho-chloroformyl benzoate and 34.5 grams of a polyoxyalkylol amine having a molecular weight of 5000 was reacted by heating the same with stirring at temperatures of from 80° to 90° C. for a period of 1 hour, while venting HCl from the reaction as it was formed. The polyoxyalkylol amine employed in the experiment was prepared by reacting propylene oxide with isopropanolamine in amount corresponding to approximately 68 moles of the propylene oxide per mole of the isopropanolamine, then adding ethylene oxide in amount corresponding to approximately 45 moles of the ethylene oxide per mole of the isopropanolamine. The polyoxyalkylol amine was a liquid having a viscosity of 575 centistokes at 100° F. It was miscible with water in all proportions and contained 0.28 percent by weight of nitrogen. The mixed ester reaction product of the dodecyl ortho-chloroformyl benzoate and the polyoxyalkylol amine was a yellow paste at room temperature. The product was a liquid at 100° C. having an absolute viscosity of 58 centipoises and a specific gravity of 0.9950 at 100° compared to that of water at 4° C. It was soluble in water. Surface active properties for the mixed ester product were determined employing procedures mentioned in Example 2. The product had the surface active properties:

Foam height _____ mm__ 70
Wetting time _____ min__ 0.94
Surface tension _____ dynes/sq. cm__ 35.8

EXAMPLE 9

Octyl o-chloroformyl benzoate was prepared by procedures similar to those described in parts (A) and (B) of Example 3, and reacted with a polyoxyalkylol amine similar to that described in part (C) of said example, employing procedure as described in part (D) of the example. The polyoxyalkylol amine was employed in amount corresponding to one, two and three chemically equivalent proportions, respectively, per mole of the octyl o-chloroformyl benzoate in a series of three experiments. The reaction products were all soluble in water. Surface active properties for the products were determined employing procedures mentioned in Example 2. Table I identifies each experiment and gives the chemically equivalent proportion of the polyoxyalkylol amine employed per mole of the octyl o-chloroformyl benzoate used. The table also gives the surface active properties for the product.

*Table I*

| Run No. | Proportion of Polyoxyalkylol Amine Chemical Equivalents | Surface Active Properties | | |
|---|---|---|---|---|
| | | Foam Height, mm. | Wetting Time, min. | Surface Tension, dynes/ sq. cm. |
| 1 | one | 22 | 0.41 | 32.7 |
| 2 | two | 12 | 0.42 | 32.9 |
| 3 | three | 30 | 0.85 | 32.8 |

EXAMPLE 10

A mixture of 5 grams of octadecyl ortho-chloroformyl benzoate and 18.6 grams of a polyoxyalkyl amine having a molecular weight of 3260 as described in part (C) of Example 3, was reacted employing procedure as described in part (D) of said example. The mixed ester product was a viscose brown liquid having a specific gravity of 0.9983 and an absolute viscosity of 45 centipoises at 100° C. It was soluble in water. The product had the surface active properties:

Foam height _____ mm__ 24
Wetting time _____ min__ 0.41
Surface tension _____ dynes/sq. cm__ 32.7

EXAMPLE 11

A mixture of 5 grams of dodecyl ortho-chloroformyl benzoate and 13.8 grams of a polyoxyalkylol amine having a molecular weight of 2000 was reacted employing a procedure as described in part (D) of Example 3. The polyoxyalkylol amine employed in the experiment was prepared by reacting 1,2-butylene oxide with isopropanolamine in amount corresponding to 12.8 moles of the butylene oxide per mole of the isopropanolamine, then reacting 22.8 moles of ethylene oxide per mole of the isopropanolamine starting material. The polyoxyalkylol amine was a liquid having a viscosity of 210 centistokes at 100° F. and contained 0.71 percent by weight of nitrogen. The mixed ester reaction product of the polyoxyalkylol amine and the dodecyl ortho-chloroformyl benzoate was a viscous brown liquid. It was soluble in water. The product had the surface active properties:

Foam height _____ mm__ 60
Wetting time _____ min__ 0.77
Surface tension _____ dynes/sq. cm__ 31.5

EXAMPLE 12

A mixture of 10 grams of dodecyl ortho-chloroformyl benzoate and 13.7 grams of a polyoxyalkylol amine having a molecular weight of 496 was reacted employing a procedure as described in part (D) of Example 3. The polyoxyalkylol amine employed in the experiment was prepared by reacting ethylene oxide with monoethanolamine in amount corresponding to approximately 44 moles of the ethylene oxide per mole of the ethanolamine, employing procedure similar to that described in Example 1, in the absence of a catalyst and at a reaction temperature of 100° C. The polyoxyalkylol amine was a liquid having a viscosity of 89 centistokes at 100° F., a molecular weight of 496 and contained 2.81 percent by weight of nitrogen. The mixed ester reaction product of the polyoxyalkylol amine and the dodecyl ortho-chloroformyl benzoate was a brown liquid. It was soluble in water and had the surface active properties:

Foam height _____ mm__ 39
Wetting time _____ min__ 0.94
Surface tension _____ dynes/sq. cm__ 30.1

I claim:
1. A water-soluble mixed ester composition consisting of the reaction product of (1) an alkyl monoester of a carbocyclic 1,2-dicarboxylic acid selected from the group consisting of phthalic acid and hydrogenated phthalic acids containing from 8 to 10 hydrogen atoms on the benzene nucleus and hexahydrophthalic acid, which alkyl monoester has the general formula:

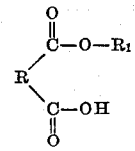

wherein, R represents a carbocyclic nucleus containing six carbon atoms and $R_1$ represents an alkyl radical containing from 8 to 18 carbon atoms, and (2) a polyoxyalkylol amine having the general formula:

$$N[(RO)_n-H]_3$$

wherein RO represents an oxyalkylene radical containing from 2 to 4 carbon atoms and $n$ is a whole number from 11 to 96, and in which polyoxyalkylol amine at least one-third of the total number of RO groups are oxyethylene radicals, in proportions corresponding to from 1 to 3 gram moles of the alkyl monoester per gram mole of the polyoxyalkylol amine, wherein the polyoxyalkylol amine has a molecular weight proportionate to the molar ratio of the alkyl monoester starting material defined by the equation:

$$\text{Mol. wt.} = 1500x - 1000$$

wherein $x$ is the molar ratio of the alkyl monoester to the polyoxyalkylol amine starting material.

2. A water-soluble mixed ester composition as claimed in claim 1, wherein the alkyl monoester is an alkyl hydrogen phthalate having the general formula:

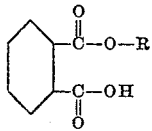

wherein R represents an alkyl radical containing from 8 to 18 carbon atoms.

3. A water-soluble mixed ester composition as claimed in claim 1, wherein the alkyl monoester is an alkyl hydrogen 4-cyclohexene-1,2-carboxylate having the general formula:

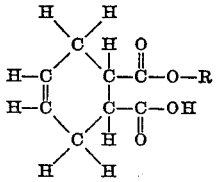

wherein R represents an alkyl radical containing from 8 to 18 carbon atoms.

4. A water-soluble mixed ester composition as claimed in claim 1, wherein the alkyl monoester is a dodecyl hydrogen phthalate.

5. A water-soluble mixed ester composition as claimed in claim 1, wherein the alkyl monoester is an octyl hydrogen phthalate.

6. A water-soluble mixed ester composition as claimed in claim 1, wherein the alkyl monoester is a dodecyl hydrogen 4-cyclohexene-1,2-carboxylate.

7. A water-soluble mixed ester composition consisting of the reaction product of equimolecular proportions of a dodecyl hydrogen phthalate and a polyoxyalkylol amine having the general formula:

$$N[(RO)_n-H]_3$$

wherein RO represents an oxyalkylene radical containing from 2 to 4 carbon atoms and $n$ is a whole number from 11 to 96, and in which polyoxyalkylol amine at least one-third of the total number of RO groups are oxyethylene radicals.

8. A water-soluble mixed ester composition consisting of the reaction product of equimolecular proportions of an octyl hydrogen phthalate and a polyoxyalkylol amine having the general formula:

$$N[(RO)_n-H]_3$$

wherein RO represents an oxyalkylene radical containing from 2 to 4 carbon atoms and $n$ is a whole number from 11 to 96, and in which polyoxyalkylol amine at least one-third of the total number of RO groups are oxyethylene radicals.

9. A water-soluble mixed ester composition consisting of the reaction product of equimolecular proportions of a dodecyl hydrogen 4-cyclohexene-1, 2-carboxylate and a polyoxyalkylol amine having the general formula:

$$N[(RO)_n-H]_3$$

wherein RO represents an oxyalkylene radical having from 2 to 4 carbon atoms and $n$ is a whole number from 11 to 96, and in which polyoxyalkylol amine at least one-third of the total number of RO groups are oxyalkylene radicals.

References Cited in the file of this patent

UNITED STATES PATENTS

| | | |
|---|---|---|
| 2,094,608 | Kritchevsky | Oct. 5, 1937 |
| 2,605,233 | De Groote | July 29, 1952 |
| 2,626,914 | De Groote | Jan. 27, 1953 |

UNITED STATES PATENT OFFICE

CERTIFICATE OF CORRECTION

Patent No. 2,835,695                                                 May 20, 1958

Alfred F. Steinhauer

It is hereby certified that error appears in the printed specification of the above numbered patent requiring correction and that the said Letters Patent should read as corrected below.

Column 8, line 65, strike out "and hexahydrophthalic acid".

Signed and sealed this 18th day of November 1958.

(SEAL)
Attest:
KARL H. AXLINE
Attesting Officer

ROBERT C. WATSON
Commissioner of Patents